Aug. 27, 1968  T. H. ELMER ETAL  3,399,043
ELECTRIC LAMP AND METHOD OF PRODUCTION
Original Filed Jan. 24, 1963

INVENTORS
Thomas H. Elmer
Martin E. Nordberg
BY
Gerhard K. Adam
ATTORNEY

United States Patent Office 3,399,043
Patented Aug. 27, 1968

3,399,043
ELECTRIC LAMP AND METHOD OF
PRODUCTION
Thomas H. Elmer and Martin E. Nordberg, Corning,
N.Y., assignors to Corning Glass Works, Corning,
N.Y., a corporation of New York
Original application Jan. 24, 1963, Ser. No. 253,681, now
Patent No. 3,258,631, dated June 28, 1966. Divided and
this application Jan. 20, 1966, Ser. No. 521,911
7 Claims. (Cl. 65—30)

ABSTRACT OF THE DISCLOSURE

A method of making an improved colored lamp envelope from a unitary non-porous 96% silica glass by providing an envelope-shaped body of porous high-silica glass, dispersing an inorganic coloring agent in the pores of the body such that the inner surface of the body is free of coloring agent and then consolidating the body at elevated temperatures to form a nonporous structure.

Figure 1:
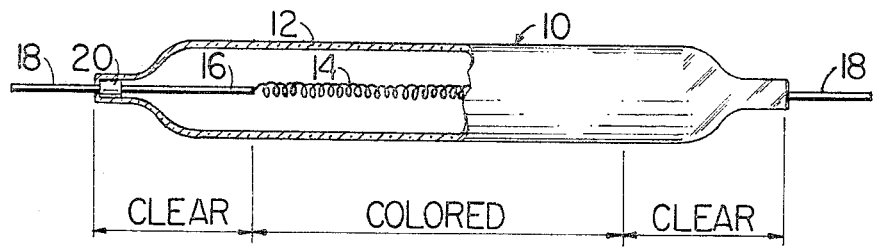

This is a divisional application of our copending application Ser. No. 253,681 filed Jan. 24, 1963 which is now U.S. Patent 3,258,631.

This invention relates to electric lamps with particular reference to the lamp envelope and its production. It is especially concerned with a consolidated, high silica glass lamp envelope containing an inorganic additive as a colorant.

Consolidated high silica glasses are well known under the generic commercial designation, "96% silica glass." They are particularly characterized by high silica contents and consequent resistance to thermal deformation or breakage by thermal shock. Also, light absorbing impurities are substantially removed during glass processing, and a controlled amount of additive may be introduced by impregnation.

This type of glass is therefore particularly adapted to production of lamp envelopes and filters having prescribed light transmitting characteristics, for example infrared heat lamps. An infrared lamp operates at a sufficiently high temperature to require the thermal resistance of a high silica glass envelope. The lamp envelope is further required to suppress total visible transmission below about 10%, transmit at least 50% in the near infrared, and provide a psychologically effective red color.

United States Patent No. 2,221,709 issued to Hood et al. describes basic production steps for producing consolidated high silica glasses and sets forth a family of particularly suitable parent borosilicate glasses. Briefly, the method includes: (1) forming or fabricating an article of desired shape from a parent borosilicate glass; (2) thermally treating the glass article at a temperature of 500 to 600° C. for a period of time to separate the glass into a silica-rich phase and a silica-poor phase; (3) dissolving or leaching the silica-poor phase, usually with acid, to produce a porous structure composed of the silica-rich phase; (4) washing, to remove leaching residue, and drying; (5) thermally consolidating the porous structure into a non-porous vitreous article. Acid leaching of the phase separated glass leaves a highly siliceous structure retaining its original shape and having a multiplicity of intercommunicating submicroscopic pores. These are closed by thermal consolidation without fusion to form a non-porous glass body of corresponding shape but smaller dimensions. Consolidation temperatures are above 900° C. with about 1250–1300° C. being satisfactory for higher silica content glasses.

United States Patent No. 2,303,756 issued to Nordberg et al. describes a modification of this glass forming technique. The porous glass is impregnated with a solution of an inorganic glass-coloring agent, e.g., a metal salt or other metal compound, and thereafter dried and heated without fusion to close the pores and incorporate the metal ion of the coloring agent within the glass body. For example, the desired deep red color in a heat lamp envelope is achieved with a combination of iron, nickel and aluminum salts which convert to the corresponding oxides during thermal treatment.

Recent evidence indicates that materials introduced into the glass by impregnation in this manner may interfere with normal operation in certain types of lamps. In particular, there is evidence that additives such as iron or nickel oxides may react or combine with other lamp parts, for example tungsten from the filament in an infrared heating lamp, to produce an adverse effect on lamp operation and/or light transmission.

It has now been found that this situation can be satisfactorily remedied by providing a lamp envelope wherein color additives are excluded from a thin layer on the interior surface. This layer need only be on the order of 0.1–0.2 mm. thick, to be effective. The remainder of the envelope, or any portion desired, may be impregnated with additives in the usual manner.

It has further been found that such partially impregnated envelopes may be produced by modifying the conventional impregnation process. In particular, an envelope containing a solution at or near its inner glass surface is selectively dried from the outer surface to insure a clear inner layer of glass. A further feature of the present invention then is provision of a simple, commercially acceptable method of producing the new lamp envelope.

The improved electric lamp of the present invention is characterized by a unitary consolidated high silica glass envelope, consisting of integral outer and inner sections, at least a portion of the outer section having a coloring agent incorporated therein to provide substantially uniform light transmission characteristics, and the inner section being essentially free of the incorporated coloring agent. The invention further includes a method of producing such a consolidated high silica glass envelope which comprises impregnating the outer layer with a source of the glass coloring agent, providing an inner layer essentially free of coloring agent, and then firing the partially impregnated envelope to a non-porous state.

Figure 2:
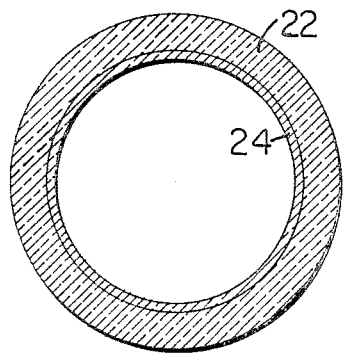
Figure 3:
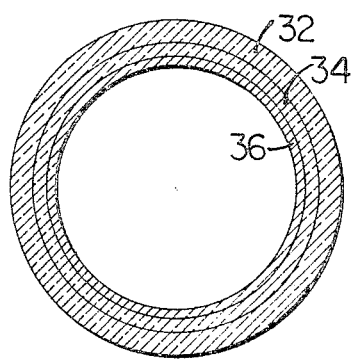

The invention is further described with reference to the drawing wherein,

FIG. 1 is a side view, partly broken away, of an incandescent infrared heating lamp produced in accordance with the invention, and FIGS. 2 and 3 are enlarged cross section views of lamp envelopes illustrating specific embodiments of the invention.

In FIGURE 1, incandescent, infrared heating lamp 10 has a tubular glass envelope 12 composed of clear and colored sections as labeled. It further includes a coiled tungsten resistance wire 14, terminating in enlarged straight portions 16, and external terminal members 18—18 connected to wire portions 16 by thin molybdenum foils 20 to which envelope 12 is sealed. The seal is a pinch seal or other known type of seal employed between molybdenum foil and high silica or quartz-type glass envelopes. Electrical connections are made to terminal members 18 in accordance with conventional means not shown. Optionally, thin tantalum supports may be provided to centrally position filament 14.

The selective impregnation feature characterizing the present invention is illustrated in FIG. 2, a cross section view of an envelope such as envelope 12 somewhat enlarged for purposes of illustration. As shown, the central colored portion of envelope 12 is composed of an external section 22 and an internal section 24. Section 22 has colorant oxides distributed throughout by impregnation with suitable salts followed by drying and consolidation. In accordance with the present invention, internal layer 24 is maintained free of such additives. As described later, this may be accomplished by unilateral impregnation and/or moving the solution inwardly into the glass from the internal surface of the tube during drying. Upon firing and consolidation, the clear inner portion 24 of the tube remains free of colorant or additive materials.

A porous glass envelope may be unilaterally impregnated by introducing impregnating solution into the porous glass from the external or outside surface only. The porous glass envelope is provided with a stopper or cap at each end. It is then immersed in a suitable salt impregnating solution for a sufficient time to permit the impregnating solution to penetrate from the outside surface into the porous glass to the depth desired. The impregnated porous tube is then removed from the solution, rinsed to remove residual material from the surface, dried and fired in accordance with conventional consolidation practice.

The required depth of penetration of the solution will depend on solution concentration and density of color, that is light absorption, desired. It is convenient to impregnate only the outer half of the envelope, that is to provide penetration of solution up to the central leach plane of the tube. While some delay occurs in penetrating this plane, the inner section may nevertheless be impregnated from the outer surface, if required. However, with solution near the inner surface, care must be taken to avoid additive being drawn to the surface during drying. To this end, it is desirable to leave the tube capped and dry from the outer surface only.

If desired, a glass envelope may also be impregnated from both surfaces in conventional manner. In such case, the envelope is immersed with the ends open. After impregnation, the open ends are capped or stoppered during drying, so that the envelope is dried entirely from the outside surface. With such unilateral drying, solution at the inner surface is drawn into the interior to a sufficient extent to provide the requisite clear surface layer on consolidation.

The methods just described are particularly adapted to large volume, batch type operations where a plurality or bundle of tubes are immersed in a bath. In such an operation, impregnation must occur slowly to enable attaining relative uniformity of color in all envelopes despite time variations in handling. Accordingly, it is desirable that the porous envelopes be immersed wet, since wet porous glass is impregnated, that is penetrated by solution, at a considerably slower rate than dry glass.

Alternatively, a porous glass tube may be rolled across a resilient, sponge-like surface containing the impregnating solution. The impregnating solution is picked up and drawn into the glass pores or capillaries from the surface. The rolling is continued for sufficient time to permit the desired degree or depth of impregnation. This procedure is adapted to use on dry glass where faster impregnation is desired and feasible. It is particularly convenient to use where a substantial portion of the envelope is to remain clear or unimpregnated.

As shown in FIGURE 1, for example, end sections of envelope 10 are completely uncolored and hence free of additive. This facilitates the tubulation and terminal sealing process. In the lamp of FIGURE 1, the clear sections correspond approximately to enlarged end portions 16 of the filament which run relatively cooler than the coiled portion and hence do not require color filtering.

By way of specific illustration, the invention is described with reference to production of a lamp envelope such as envelope 12 of FIGURE 1.

A length of porous high silica glass tubing was produced in accordance with procedures and materials generally described in previously mentioned United States Patent No. 2,303,756. Tubing was drawn in conventional manner from a suitable borosilicate glass melt and heat treated at a temperature of 550 to 600° C. for sufficient time to separate the glass into a silica-rich phase and a silica-poor phase. The silica-poor phase was removed by acid leaching to provide a porous skeleton composed of the residual silica-rich phase and retaining the original tubular shape.

The porous tubing thus produced was provided with an inert plastic cap over each open end. The cap extended a distance up the external tube wall coincident with the clear end portions shown in FIGURE 1. The capped tubing was immersed wet for about 35 minutes in an impregnating solution composed of a mixture of 300 grams each of iron, nickel, and aluminum nitrates dissolved in sufficient 0.1 normal nitric acid to provide one liter of solution. This was sufficient to produce impregnation just short of the inner surface in this tubing having a 1.25 mm. wall thickness in the porous state.

The tubing was removed, thoroughly rinsed to remove residual impregnating materials from the surface and dried by application of forced air to the tubing surface. The tubing remained capped during drying so that evaporation occurred from the outside surface only. The dried tubing was heated in air to a temperature of about 850° C. at a rate of 100° C. per hour, then transferred to a vacuum furnace at 900° C. After a half hour hold to attain equilibrium, it was heated to a temperature of 1250° C. with hold times of one hour each at 950° C., 1000° C., 1050° C. It was held for about a half hour at 1250° C. to insure complete consolidation of the impregnated porous glass to a non-porous condition.

A luminous transmittance measurement was made through one wall of the consolidated glass tube envelope, with an unfiltered photronic foot candle meter with a 2700° K. tungsten light source. The percent transmittance was 4.5%. Visual examination of a cross section showed the tubing to be colored as in FIG. 3. An outer annular half 32 was intensely colored. Inwardly from this was a lightly colored zone 34 indicating a lower concentration due to the barrier effect along the central plane of the porous glass. Along the inner wall was a thin layer of clear glass 36, indicating no colorant additive.

A low water content in the glass is normally desired to enhance infrared transmission and prolong filament life. For this purpose, the porous glass may be treated in an ammonium fluoride solution, in accordance with the teachings of United States Patent No. 2,982,053, prior to being introduced into the impregnating solution described above. For example, porous tubing, as described above, was immersed in a 4% ammonium fluoride solution for about two hours at room temperature and thereafter, while still wet, was impregnated with a nitric acid solution of iron, nickel and aluminum nitrates and consolidated, as described above. In accordance with the patent teaching, infrared transmission at 2.72 microns wavelength was greatly enhanced by the fluoride treatment, while luminous transmission was decreased to 2%.

Similar porous glass envelope tubes were impregnated with a 0.1 N nitric acid solution of 150 grams each of iron, aluminum, and nickel nitrates per liter of solution for one hour. The tubes were impregnated from both surfaces, that is were uncapped during impregnation. They were then capped and dried entirely from the outer surface with forced air as before. After consolidation as above, luminous transmittance through one wall was 2.2% as compared to 8.0% for a similar tube impregnated from one surface only. Visual inspection showed a cross section as shown in FIG. 2.

The preceding description has been provided in order to illustrate a preferred embodiment and practice of the invention. Various modifications and alternative embodiments will be readily apparent within the scope of the appended claims. In particular, the invention is generally applicable to the production of lamp envelopes regardless of the particular impregnating materials introduced into the glass.

We claim:
1. A method of producing a unitary consolidated high-silica glass lamp envelope comprising:
  providing a porous, high-silica glass envelope-shaped body,
  impregnating the pores of at least part of only an outer section of the wall of said body with a solution of an inorganic coloring agent, and
  firing said body at elevated temperatures above 900° C. to consolidate said porous body to a non-porous envelope having a wall characterized by an outer section containing said coloring agent and an inner section free from said coloring agent.

2. The method in accordance with claim 1 wherein a solution of the coloring material is introduced unilaterally from the outside surface of the porous glass body into the outer section thereof.

3. The method in accordance with claim 1 wherein a solution of the coloring material is introduced unilaterally from the outside surface of the porous glass body into the outer section terminating at the central plane of said body.

4. The method in accordance with claim 1 wherein a solution of the coloring material is introduced unilaterally from the outside surface of the porous glass body into the outer section thereof such that the inner surface of the envelope is free from said coloring agent to a thickness of at least 0.1 mm.

5. The method in accordance with claim 2 wherein the envelope is at least partially immersed in a solution of coloring material to introduce the solution into a section from the outside surface only of the envelope.

6. The method in accordance with claim 1 which includes the step of treating the porous glass body with an ammonium fluoride solution prior to introducing the coloring material and firing the body.

7. A method of producing a unitary consolidated high-silica glass lamp envelope the wall of the envelope being characterized by an outer section containing an inorganic glass coloring agent and an uncolored inner section which comprises:
  impregnating the wall of a unitary porous, high-silica glass lamp envelope through both the inner and outer surfaces of said wall with a solution of the salt of at least one inorganic coloring agent,
  drying said envelope unilaterally from the outside surface to provide an outer section of the wall of the lamp envelope impregnated with coloring agent and an inner section of the wall which is essentially free from said coloring agent, and
  firing the impregnated envelope at elevated temperatures to consolidate said envelope, thereby converting said envelope from a porous to a non-porous state.

References Cited
UNITED STATES PATENTS

| | | | |
|---|---|---|---|
| 2,340,013 | 1/1944 | Nordberg et al. | 65—31 |
| 2,982,053 | 5/1961 | Elmer | 117—124 |

DONALL H. SYLVESTER, *Primary Examiner.*

E. R. FREEDMAN, *Assistant Examiner.*